fore it passes the valve, the effective area of the piston faces being greater than the effective area of the valve, whereby a relative increase of pressure of one fluid acts to move the valve toward the inlet for the fluid having the higher pressure and correspondingly restrict the admission thereof.

8. In a fluid mixing device, the combination of a casing providing hot and cold fluid inlets and a tempered fluid outlet, a valve reciprocable between said inlets to vary the quantities of respective fluids admitted without changing the total quantity thereof, and a piston rigidly connected to the valve, one face of the piston being exposed to the pressure of the cold fluid before it passes said valve and the other face of the piston being exposed to the pressure of the hot fluid before it passes the valve, the effective area of the piston faces being greater than the effective area of the valve, whereby a relative increase of pressure of one fluid acts to move the valve toward the inlet for the fluid having the higher pressure and correspondingly restrict the admission thereof.

9. In a fluid mixing device, the combination of a casing providing hot and cold fluid inlets and a tempered fluid outlet, a valve reciprocable between said inlets to vary the quantities of respective fluids admitted, a thermostat for positioning said valve according to the outlet temperature of the mixed fluids, and a piston rigidly connected to the valve and acting in conjunction with said thermostat, one face of the piston being exposed to the pressure of the cold fluid before it passes said valve and the other face of the piston being exposed to the pressure of the hot fluid before it passes the valve, the effective area of the piston faces being greater than the effective area of the valve, whereby a relative increase of pressure of one fluid acts to move the valve toward the inlet for the fluid having the higher pressure and correspondingly restrict the admission thereof.

Signed at Chicago, Ill., this 24 day of October, 1921.

FRED W. POWERS.
MORTON O. SNEDIKER.

May 22, 1923.
W. W. RAMSEY
HUB LINER
Filed Oct. 9, 1918
1,455,935
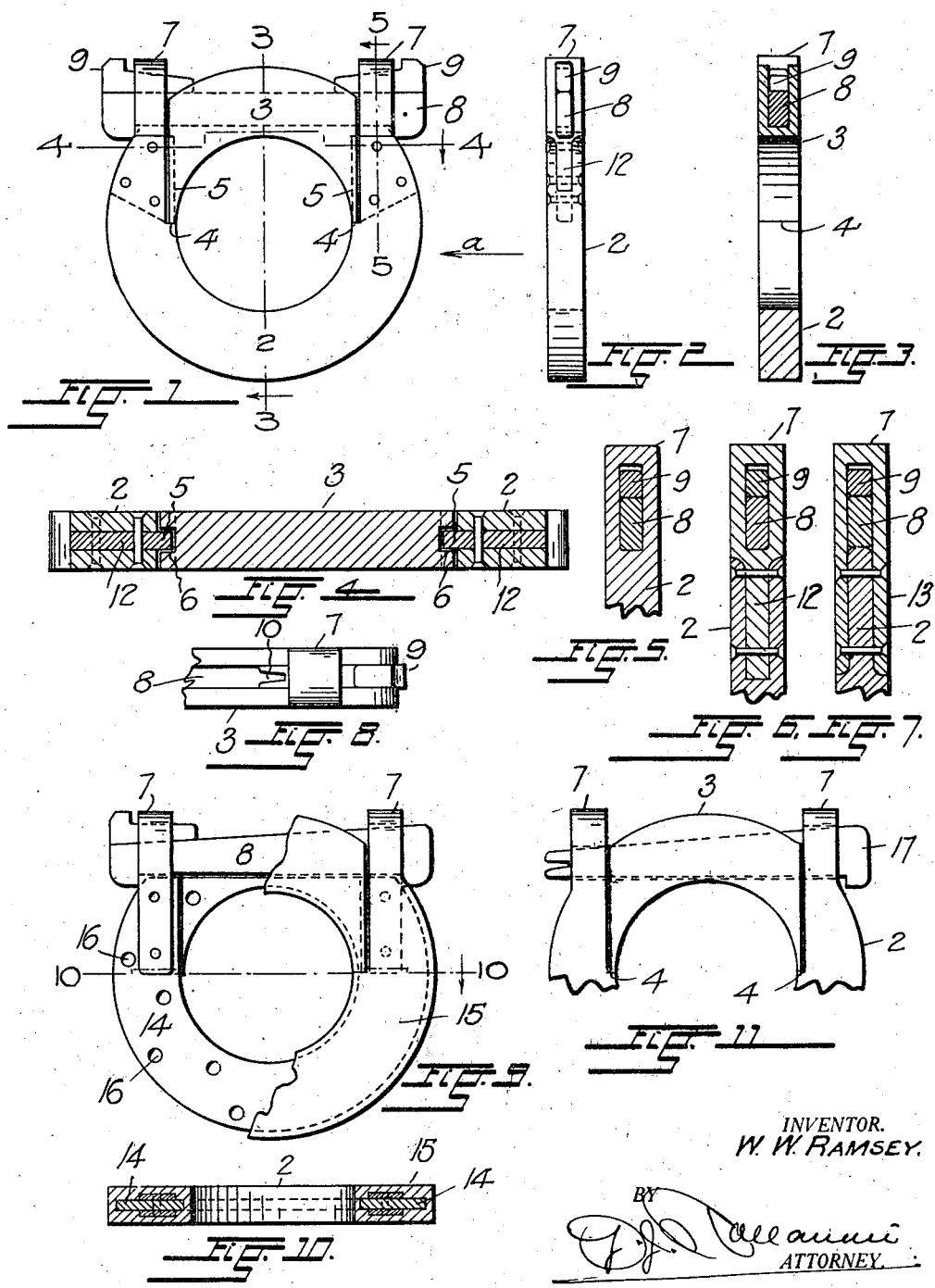
INVENTOR.
W. W. RAMSEY.
BY
ATTORNEY.

Patented May 22, 1923.

1,455,935

UNITED STATES PATENT OFFICE.

WILLIAM WALLACE RAMSEY, OF STERLING, COLORADO.

HUB LINER.

Application filed October 9, 1918. Serial No. 257,452.

*To all whom it may concern:*

Be it known that I, WILLIAM W. RAMSEY, a citizen of the United States, residing at Sterling, in the county of Logan and State of Colorado, have invented certain new and useful Improvements in Hub Liners, of which the following is a specification.

This invention relates to so-called "hubliners" used principally on locomotives to take up the lateral or lost motion between the journal boxes and the wheels thereof.

It is the primary object of my invention to provide a liner which when placed around an axle performs its function without being secured to either the box or the wheel between which it is positioned, and which may be readily removed for repairs or renewal and replaced without disturbing the position of the wheel or the axle or any part of the box in which the axle is supported.

With this and other objects in view, all of which will fully appear in the course of the following description, my improved liner consists of a normally continuous flat-sided ring or washer preferably made of copper or a suitable anti-friction copper compound, which is capable of being opened for its application to or removal from the portion of the axle between the wheel and the journal box around which it is fitted when it is slid through the space between the same.

The entrance to the opening in the washer is preferably produced by the removal of a sliding section which is normally held in position by keys or other suitable locking means.

In the accompanying drawings in the various views of which like parts are similarly designated I have shown several forms of my invention all based on the same principle but differing from each other in details of construction.

Figure 1 represents my improved liner in its preferred form,

Figure 2, an edge view of the same looking in the direction of the arrow *a* in Figure 1;

Figure 3, a section taken on the line, 3—3, Figure 1, and

Figure 4, a section on the line 4—4, Figure 1, drawn to an enlarged scale.

Figures 5, 6 and 7 represent enlarged sections on a plane indicated in Figure 1 by the line 5—5, showing different methods of constructing the key-ways which hold the keeper and the keys by which the removable section of the liner is locked in its operative position with respect to the body-section of the same;

Figure 8 represents a fragmentary top view of the liner shown in Figure 1;

Figure 9, illustrates a modified construction of the liner, part of which is broken away to expose its metal core;

Figure 10, a section taken on the line 10—10, Figure 9, and

Figure 11, a fragmentary elevation of the liner illustrated in Figure 1, showing a modification of the means by which the removable section thereof is locked in place.

Referring first to Figures 1, 2, 3, 4 and 8 of the drawings, my improved liner consists of a flat-sided ring or washer made of copper, copper-compound or other suitable antifriction material and composed of a body section 2 and a removable section 3.

The removable section of the liner occupies a passage in the body section of the same which in width slightly exceeds the interior diameter of the central opening of the ring. Shoulders 4 at the inner end of this passage provide a seat for the removable section, and feathers 5 extending along the edges of the passage cooperate with corresponding grooves 6 in the edges of the removable section to slidably hold the latter against lateral displacement with relation to the body section.

Parallel ears 7 extending beyond the circumferential edge of the body-section of the ring at opposite sides of its passage are slotted for the reception of a keeper 8 extending through a groove in the outer portion of the removable section, which is alined with the slots, and keys 9 which lock the keeper in place.

The keeper is preferably composed of a bar of substantially uniform width provided with lips to engage the outer edges of the ears below their slots, and the keys which are driven through the slots along the outer edge of the keeper, consist of headed and tapering pieces of metal which may be split as shown at 10 in Figure 8, to permit of spreading their end portions for the purpose of securely locking them against accidental displacement.

The ears are in the form of my invention shown in Figure 1, made separate from the body portion of the ring and secured thereto in the manner best shown in Figure 5.

The ears are provided with integral shanks 12 of reduced thickness which are fitted in